(12) United States Patent
Murata (10) Patent No.: US 6,246,488 B1
(45) Date of Patent: *Jun. 12, 2001

(54) RECORDING APPARATUS

(75) Inventor: Masahiko Murata, Chofu (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/925,432

(22) Filed: Sep. 8, 1997

(30) Foreign Application Priority Data

Sep. 12, 1996 (JP) .................................................. 8-241461

(51) Int. Cl.[7] .................................................. G06F 15/00
(52) U.S. Cl. .......................................... 358/1.14; 358/468
(58) Field of Search ............................... 395/114; 347/43, 347/40, 252, 131, 2; 358/298, 401, 400, 500, 501, 471, 497

(56) References Cited

U.S. PATENT DOCUMENTS

| | | | |
|---|---|---|---|
| 4,555,802 | 11/1985 | Fedak et al. | 382/56 |
| 5,416,615 | 5/1995 | Shirota | 358/530 |
| 5,502,804 | 3/1996 | Butterfield et al. | 395/147 |
| 5,706,046 | * 1/1998 | Eki | 347/252 |
| 5,754,198 | * 5/1998 | Nishikawa | 347/43 |

* cited by examiner

Primary Examiner—Jerome Grant, II
(74) Attorney, Agent, or Firm—Fitzpatrick, Cella, Harper & Scinto (57) ABSTRACT

A plurality of image processors each include an image generation unit which generates image data for respective drawing units based on input record data. An image memory stores the image data generated by the image generation unit, and a data transfer unit transfers the record data from the image memory to a recording mechanism in synchronism with an operation of the recording mechanism. Image data of different areas of an image are alternately generated by the plurality of image processors, and are recorded on a recording medium.

20 Claims, 10 Drawing Sheets

RECORDING APPARATUS

BACKGROUND OF THE INVENTION

1. Field of the Invention

The present invention relates to a recording apparatus for recording input record data in accordance with a predetermined recording scheme.

2. Related Background Art

Figure 10:
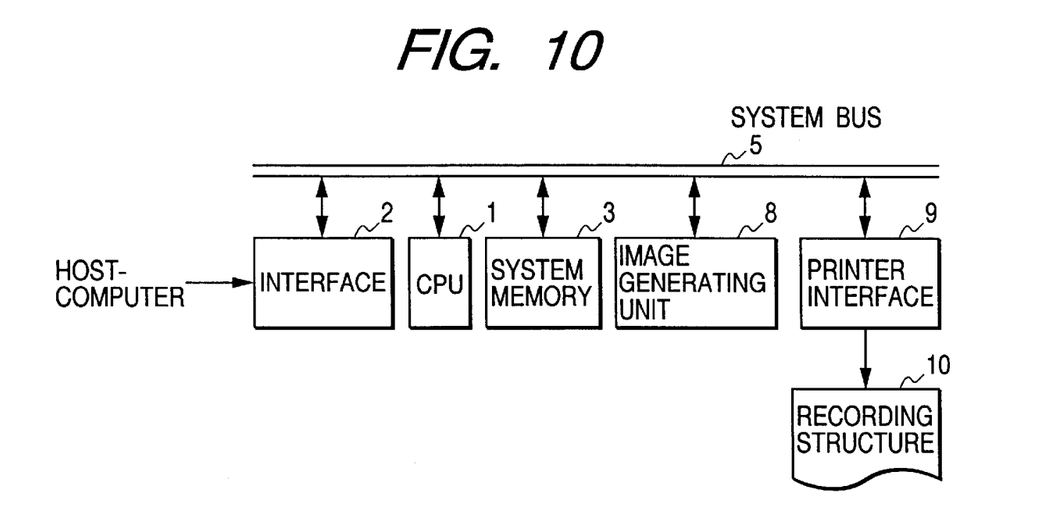
FIG. 10 shows a block diagram of a configuration of a prior art recording apparatus.

FIG. 10 shows a configuration of a prior art page printer such as a laser printer. As shown, in the prior art printer, a configuration to connect all devices to one system bus 5 was standard. In FIG. 10, a CPU 1 for controlling the entire system, an interface 2 for connection with a host computer, a system memory 3, an image generation unit 8 for generating a bit map image in accordance with an input character code and a printer language and a printer interface 9 for controlling a recording mechanism (printer engine) 10 are connected to the system bus 5.

In such a configuration, the respective units interfere with each other due to the collision of data on the system bus and the performance is lowered.

The page printer comprises a video controller and a printer engine. The video controller receives print data described in a printer language from a host computer or the like and develops the print data into image data represented by a dot image matrix. In order to store one page of image data, a large memory capacity is required in the printer. As the sheet size or the resolution increases, the number of bits necessary for the memory increases. In order to reduce the memory capacity, a band buffer technique is often used. In the band buffer technique, a page corresponding to the print image is divided into bands in a sheet feed direction. A plurality of band buffers are cyclically used for each output page, and the developing process for one band buffer and the transmission process of the image data from another band buffer to the printer engine are performed in parallel. Usually, the printer engine of an electronic photographic printer such as the laser printer cannot be stopped in the course of the printing of one page. When such a printer engine is used, the developing process takes too much time to prepare the image data to be shipped to the printer engine. Within a record time of one record band, the generation (development) of the image of the next band must be completed. When the amount of print data is large or complex, the generation of the image is not completed in time and an overrun error is unavoidable.

Figure 11:
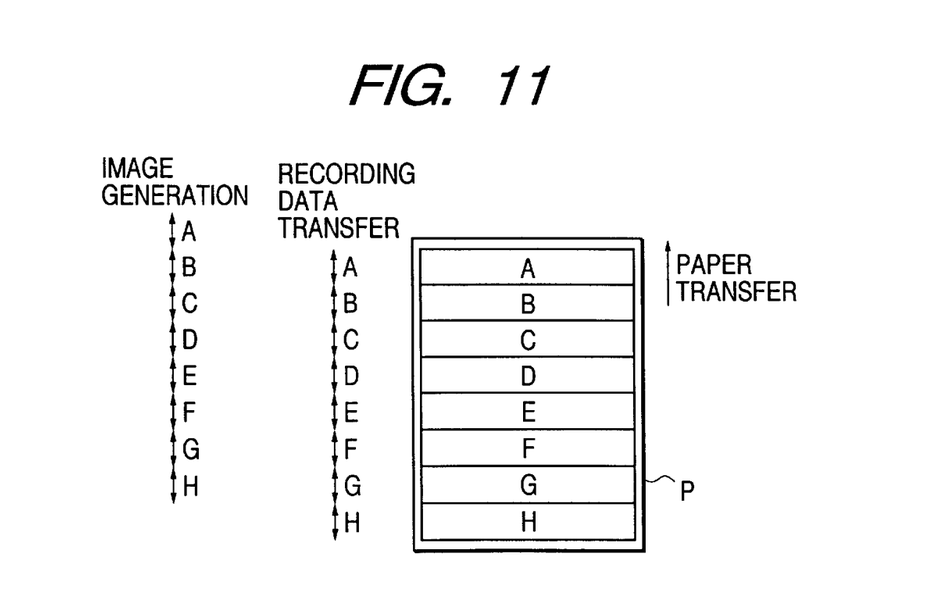
FIG. 11 illustrates an image recording operation of the prior art recording apparatus.

In FIG. 11, symbols A, B, C, . . . indicate record bands (record areas) on a record sheet which is a recording medium, and each section designated as "record data transfer" indicates a section to transfer data of a corresponding band from the image generation unit 8 to the printer interface 9. Each section designated as "image generation" indicates a section to generate image data by the image generation unit 8.

In the prior art, as described above, sufficient image generation velocity for the recording speed of the recording mechanism cannot be attained depending on an operation status, and overrun may occur or throughput may be lowered. Accordingly, recording resolution is reduced in preparation for the overrun or an image memory capable of storing a full page of image data is attached and the entire image data is developed in the image memory before it is recorded.

However, in order to attach the image memory capable of storing the full page of image data, an increase of the cost of the system is unavoidable or a user has to add an image memory supplied as an optional part.

Further, when the resolution is reduced, the recording quality is necessarily lowered.

Further, since the bus for memory accessing is shared with the CPU 1, the image generation unit 8, the printer interface 9 and other I/O devices, when the data amount increases, the performance is significantly lowered due to the traffic on the bus.

SUMMARY OF THE INVENTION

Accordingly, it is an object of the present invention to provide a recording apparatus capable of outputting an image at high precision, preventing printer overrun and executing output at high speed.

It is, therefore, an object of the present invention to provide a recording apparatus which improves the throughput of the record process and is capable of conducting a flexible operation in accordance with the data amount and complexity to be recorded.

In order to achieve the above object, in accordance with the present invention, a plurality of image processors each including an image generation unit for generating image data for each drawing unit based on the input record data, an image memory for storing the image data generated by the image generation unit and a data transfer unit for transferring the record data from the image memory to a recording mechanism in synchronism with an operation of the recording mechanism are provided, and image data of different areas on a recording medium are alternately generated by the plurality of image processors.

DETAILED DESCRIPTION OF THE PREFERRED EMBODIMENTS

Embodiments of the present invention are now explained with reference to the drawings.

[First Embodiment]

Figure 1:
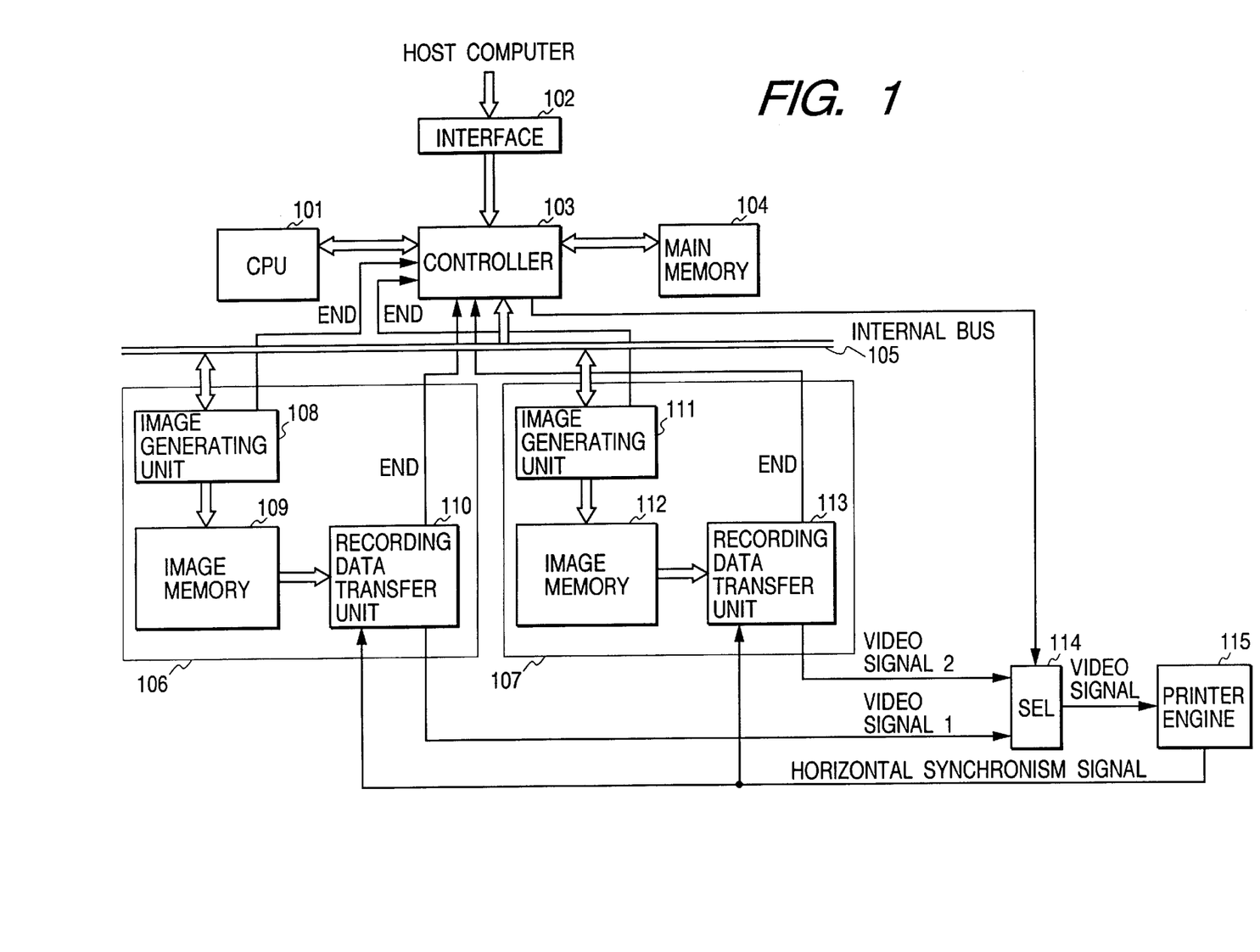
FIG. 1 shows a block diagram of a configuration of a first embodiment of the recording apparatus of the present invention.

FIGS. 1 to 5 are directed to a first embodiment of the present invention, and FIG. 1 shows a configuration of a printer in accordance with the present invention.

In FIG. 1, numeral 101 denotes a CPU for conducting overall control and data processing, numeral 102 denotes an interface for connection with an external device such as a host computer which is a data source, numeral 103 denotes a controller for generating control signals to the respective units, numeral 104 denotes a main memory, and numeral 105 denotes an internal bus for connecting an image processor.

In the present invention, two image processors 106 and 107, each comprising the image generation unit, the image memory and the record data transfer unit, are provided.

The image processors 106 and 107 are connected to the internal bus and each include the image generation units 108 and 111, the image memories 109 and 112 and the record data transfer units 110 and 113, respectively.

The image generation units 108 and 111 generate bit maps in accordance with data supplied from the bus (specifically, the applications and object data to be described later) and develop them in the image memories 109 and 112.

The outputs of the two image processors 106 and 107 are selected by a selector 114. Namely, one of VIDEO signal 1 and VIDEO signal 2 outputted from the record data transfer units 110 and 113, respectively, is selected by the selector 114 and transferred to the printer engine 115.

The printer engine 115 is composed by various recording schemes such as a laser beam printer.

Figure 2A:
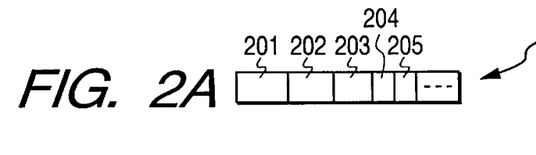
FIGS. 2A, 2B, 2C, 2D, 2E, 2F, 2G and 2H illustrate data structures in the apparatus of FIG. 1 and a manner of image generation.
Figure 2B:
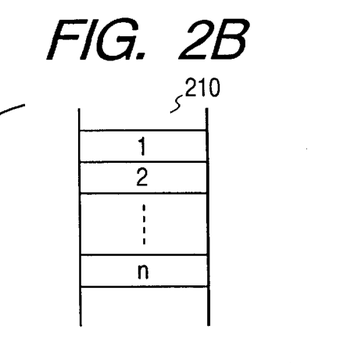
Figure 2C:
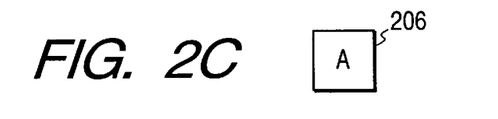
Figure 2D:
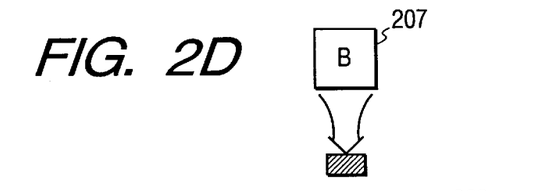
Figure 2E:
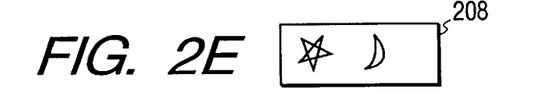
Figure 2F:
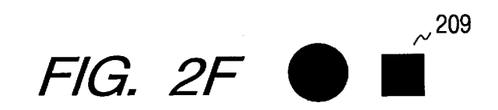
Figure 2G:
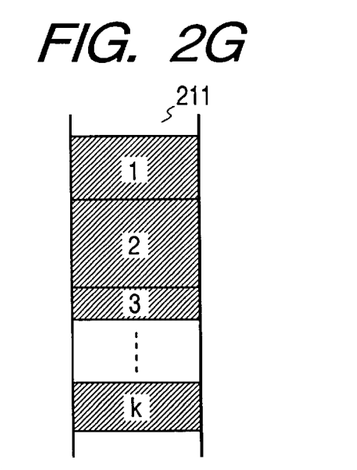
Figure 2H:
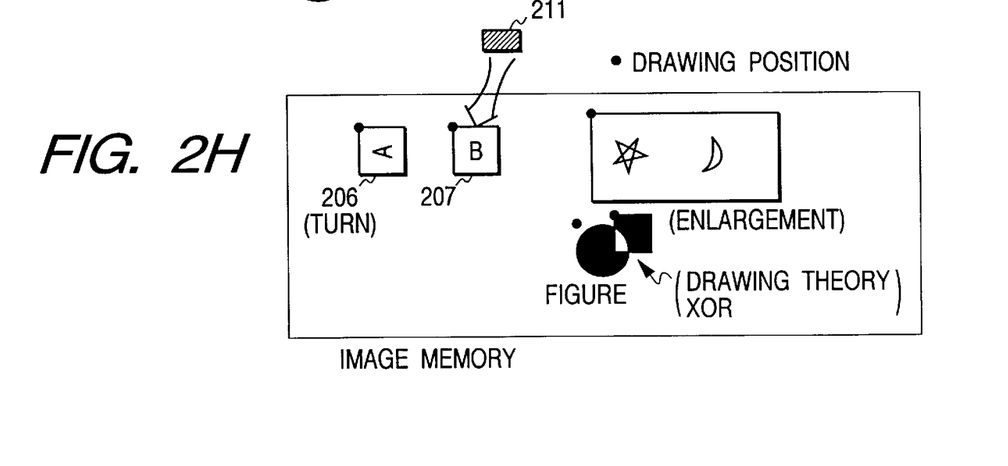

FIGS. 2A to 2H show the image generation process of the present invention. FIG. 2A shows a configuration of the application, FIG. 2B shows an application list configured in the main memory 104, FIGS. 2C to 2F show various object data in which FIG. 2C shows a bit map font object 206, FIG. 2D shows a compression font object 207, FIG. 2E shows an image object 208 and FIG. 2F shows a (format) line and graphic object 209, FIG. 2G shows object data 211 configured in the main memory 104, and FIG. 2H shows an image drawn based on the information of the application in the image memories 109 and 112.

As shown in FIG. 2A, the application comprises a draw position 201 of various object data such as bit map object and image, an object number 202 for identifying the object data and attribute data such as draw logic 203, enlargement 204 and rotation 205 which is logic in superimposing the objects. Such application data is stored at a predetermined address of the main memory 104 in a list (table) format as shown by 210 in FIG. 2B.

The object data 211 is data written in various formats and includes the bit map font 206 (FIG. 2C), the compression font 207 (FIG. 2D), the image 208 (FIG. 2E) composed by the bit map data having any shape or color and the (format) line and graphics 209 (FIG. 2F) having a predetermined basic shape. The object data are stored at the predetermined object data area of the main memory 104 as shown in FIG. 2G and each object data 211 is identified by the object number 202 of the application list.

When the record command or the record data described in the format such as the character code and the printer control language is received from the host computer through the interface 102, the data to which the CPU 101 and the controller 103 correspond in the storage format as shown in FIGS. 2A to 2G is stored on the main memory 104 in accordance with the received data.

Namely, the CPU 101 analyzes the command or the data stored in the main memory 104, determines the record position, the draw logic, the enlargement and the rotation for each draw unit such as a character or an image from the record command, generates the application data having the configuration as shown in FIG. 2A, and composes the application list 210 as shown in FIG. 2B in the main memory 104.

It also composes the image data for drawing the application at the predetermined area in the main memory as the object data 211 as shown in FIG. 2G.

As described above, the object number in the application of FIG. 2A indicates the object number to be drawn of the above object group. When the application list 210 and the object group 211 for a record band are generated, the head address of the application list 210 is applied to start the image processors 106 and 107.

In the image processors 106 and 107, the image generation units 108 and 111 read one application 104 from the application list 210 from the main memory and specify and read the object data as the required draw data from the object number 202 in the application list 210, apply the process such as the decompression of the compressed data, the rotation and the enlargement, and write it to the addresses corresponding to the draw positions on the image memories 109 and 112.

FIG. 2H shows an image drawn based on the information of the application in the image memory. The object is normally arranged to match the predetermined position thereof to the specified draw position. In FIG. 2H, the draw position is indicated by a dot.

This is sequentially conducted to all applications in the application list. When all applications have been executed, one record band of an image has been drawn in the image memory 109 or 112.

FIG. 3 shows a method of transferring the image data configured in the image memory 109 or 112 to the recording mechanism (printer engine 115) as a record video signal. FIG. 3A shows a horizontal synchronization signal generated by the printer engine as the recording mechanism, FIG. 3B shows a video clock oscillating at the period of the video signal in synchronism with the horizontal synchronization signal, FIG. 3C shows video data sent to the printer engine in synchronism with the video clock, and FIG. 3D shows a content of the image memory corresponding to one record band.

Figure 3A:
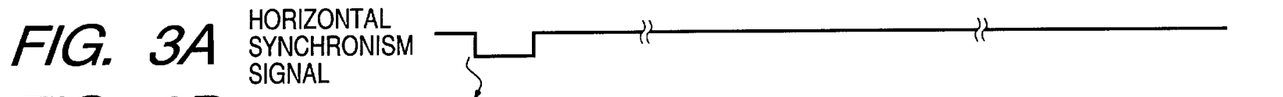
FIGS. 3A, 3B, 3C and 3D illustrate the transfer of the generated image data.
Figure 3B:
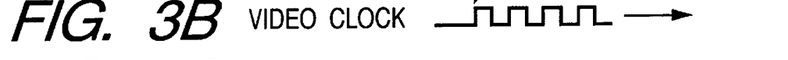
Figure 3C:
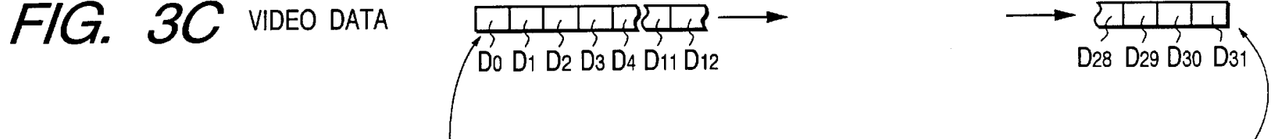
Figure 3D:
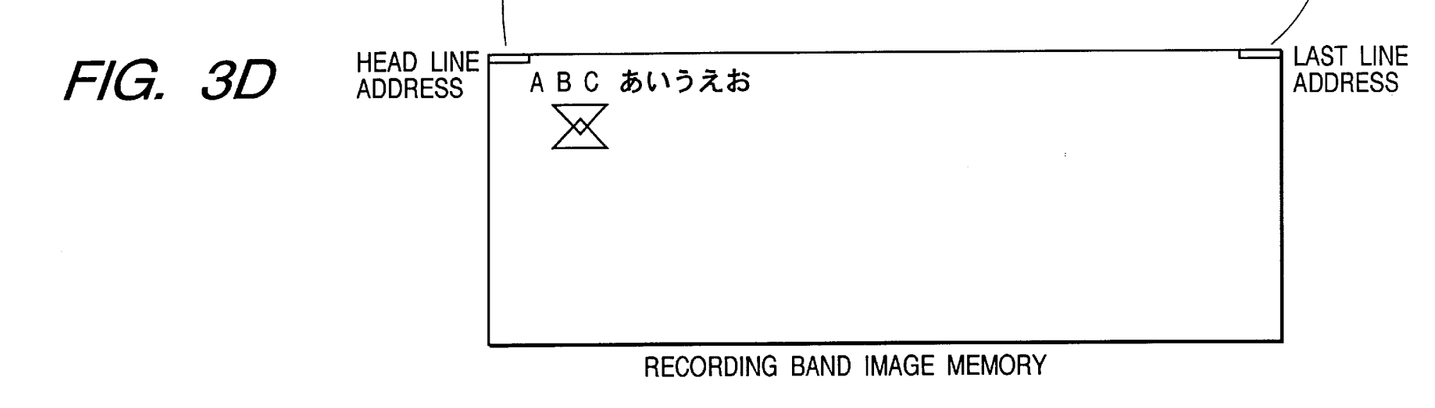

One record band of image data formed in the image memories 109 and 112 is in a format as shown in FIG. 3D in which the left top of the image is a head address, the right bottom is an end address, and the address as increase in a raster direction, and within one address, LSB or D0 is a left end dot and MSB or D31 is a right end dot.

The printer engine 115 of FIG. 1 generates the horizontal synchronization signal of FIG. 3A, and the record data transfer unit 110 or 113 oscillates the video clock of FIG. 3B in synchronism with the horizontal synchronization signal, reads the predetermined image data corresponding to the record position from the image memory 109 or 112 in synchronism with the video clock, converts it to the serial data as shown in FIG. 3C and transfer it to the printer engine 115 through the selector 114 in synchronism with the video clock of FIG. 3B to conduct the recording.

The overall operation of the image generation units 106 and 107 and the record data transfer units 110 and 113 is now explained.

Figure 4:
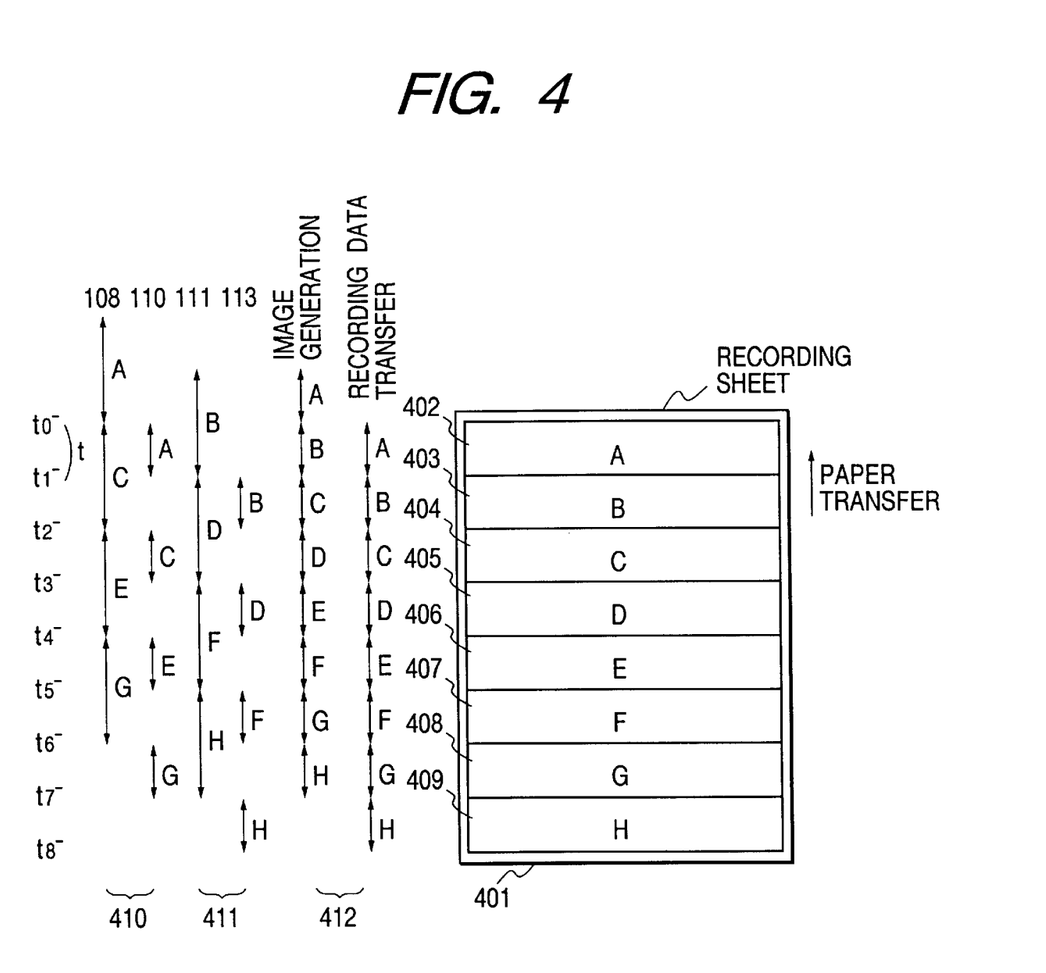
FIG. 4 illustrates one page of image record operation.

FIG. 4 shows a recording operation of the recording apparatus in accordance with the present invention. Numeral 401 denotes a record sheet as a recording medium, and numerals 402 to 409 denote record bands A to H, respectively.

Numeral 401 denotes an operation timing of the image generation unit 108 and the record data transfer unit 110 of the image processor 106. Similarly, numeral 411 denotes an operation timing of the image generation unit 111 and the record data transfer unit 113 of the image processor 107. Numeral 412 denotes a timing of the image generation and transfer by the prior art system for reference purpose.

In FIG. 4, tn represents a switch time of the record of the record band. Since the sheet feed velocity is constant, the interval is a constant times t.

As described above, the interface 102 receives the record command and the record data from the information processing system such as the host computer and transfers it to a reception buffer on the main memory 104.

The CPU 101 sequentially reads the record commands and data stored in the reception buffer and constitutes one page of an application list and object data on the main memory 104 for each record band.

When one page of the process is completed, the head address of the application list of the record band A is applied to the image generation unit 108 in the image processor 106 to start it. Thus, the image generation unit 108 starts the drawing of the record band A in the image memory 109.

Similarly, the CPU 101 starts the process of the record band B for the image processor 107.

When the image generation unit 108 completes the drawing of the record band A, the CPU 101 starts the printer engine 115. The printer engine 115 starts the sheet feed as shown in FIG. 4 and generates the horizontal synchronization signal of FIG. 3A. The record data transfer unit 110 generates the video clock in synchronism with the horizontal synchronization signal and records the image data of the record band A from the image memory 109 by the printer engine 115.

The CPU 101 starts the recording operation of the printer engine 115 at a time t0 and instructs to start the drawing of the record band C to the image processor 106. When the recording of the record band A is completed at a time t1, the record data transfer unit 110 generates an END signal. By the END signal, the CPU 101 starts the data transfer for the record data transfer unit 113 and switches the selector 114 to the VIDEO signal 2.

Since the image generation unit 111 now completes the drawing of the record band B, the drawing of the record band D is started for the image generation unit 111.

Subsequently, the record data transfer unit 113 generates the video clock in synchronism with the horizontal synchronization signal and the recording of the record band B is conducted by the printer engine 115.

When the recording of the record band B is completed at a time t2, the record data transfer unit 113 generates the END signal. By the END signal, the CPU 101 starts the data transfer for the record data transfer unit 110 and switches the selector to the VIDEO signal 1.

Since the image generation unit now completes the drawing of the record band, the drawing of the record band E is started for the image generation unit 108. Subsequently, the recording of the record band C is conducted.

The record data transfer units 110 and 113 are alternately switched at times t3 to t7 in a similar manner and the record bands are alternately processed to conduct the recording of one page, and the recording process is completed at a time t8.

Figure 5:
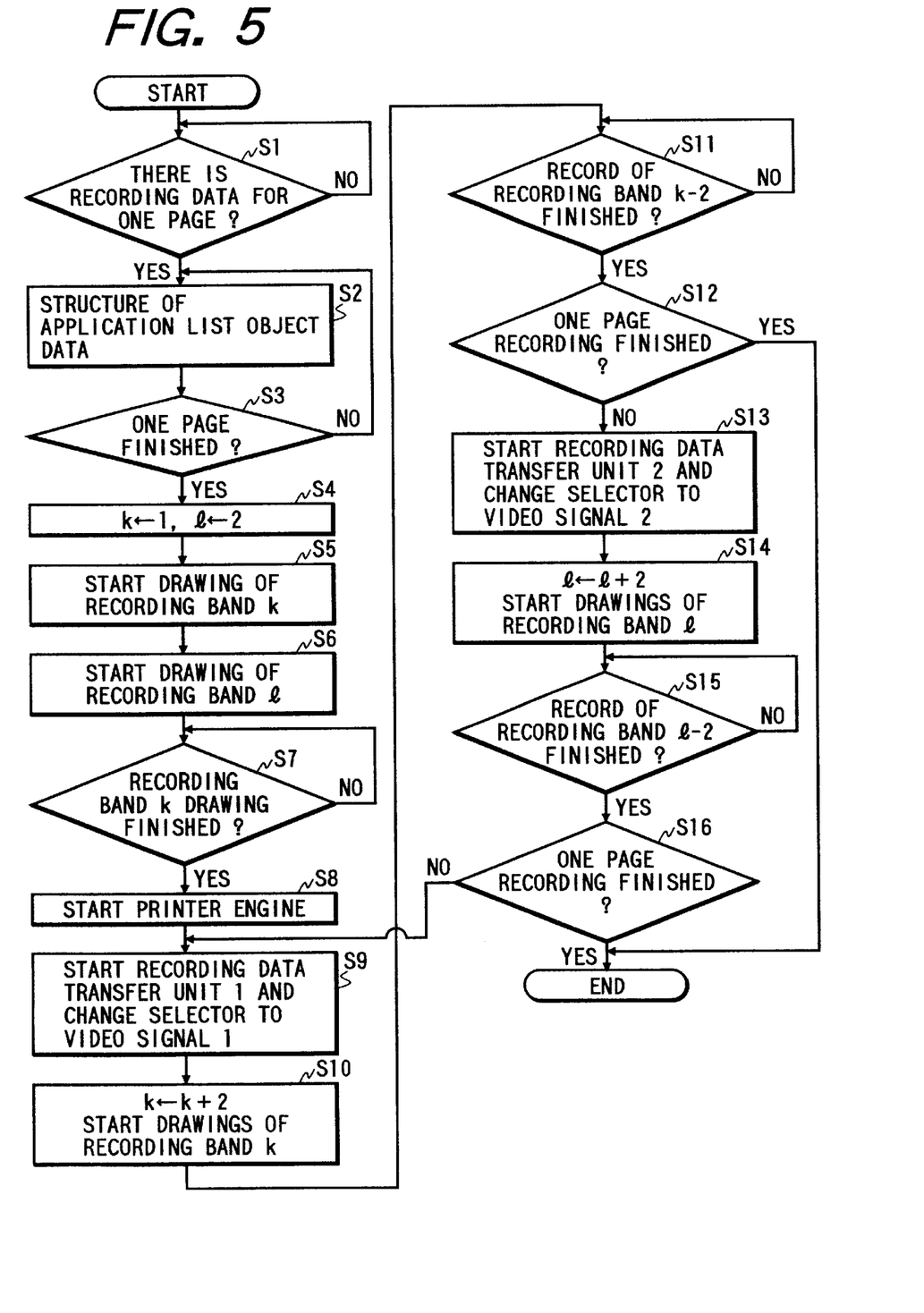
FIG. 5 shows a flow chart of control of the CPU of FIG. 1.

FIG. 5 shows a flow chart of the CPU 101 for executing the above operation. In a step S1 of FIG. 5, the CPU 101 determines whether or not one page of record data is stored in the main memory 104, and if yes, the process proceeds to a step S2.

In the step S2, the CPU 101 generates the application list 210 and the object data 211 from the received record data for each record band. In a step S3, whether or not one page of process has been completed is determined, and if yes, the process proceeds to a step S4.

In the step S4, variables representing the draw bands are defined as k and 1 for the image processors 106 and 107, respectively, and k=1 and 1=2 are set.

In steps S5 and S6, the drawing of the draw bands 1 and 2 are started for the respective image generation units, and in a step S7, whether or not the drawing of the record band k has been completed is determined, and if yes, the process proceeds to a step S8 to start the printer engine 115.

In order to improve the draw time of the record band 2 or the record band B of FIG. 4, it is desirable that a time t has elapsed from the start of the drawing of the record band B to the start of the recording operation.

In a step S9, the record data transfer unit 110 is started and the selector 114 is switched to the VIDEO signal 1. In a step S10, k+2 is newly set as k and the drawing of the record band k is started.

In a step S11, the completion of the recording of the record band currently being recorded is determined, and if yes, the process proceeds to a step S12 to determine whether or not one page of recording has been completed. If yes, the process by the CPU 101 is completed. If one page of recording is not completed, the process proceeds to a step S13 to start the record data transfer unit 2 and switch the selector to the VIDEO signal 2.

In a step S14, the draw band variable is newly set to 1+2 and the drawing of the record band 1 is started. In a step S15, the completion of the record band 1+2 is determined, and if it is completed, the process proceeds to a step S16. When one page of recording is completed, the process operation of the CPU is completed, and if it is not completed, the process returns to the step S9 to repeat the above operation.

In accordance with the present invention, the drawing of the next band has been completed before the end of one band of record as shown by 410 and 411 of FIG. 4. The draw time for each band may take 2xt for the record band process while it is only t in the prior art 412. When the draw time is longer than the draw time t, so-called overrun in which the recording operation of the image data is not conducted in time may occur.

When such an overrun takes place, the memory capacity is increased and the recording is done after the completion of one page of image generation or the resolution is lowered such that one page of image can be formed in the existing memory according to the prior art method. This method significantly deteriorates the record quality, or if the record quality is not to be lowered, a large capacity memory must be mounted and the system cost increases.

On the other hand, in accordance with the present embodiment, two image processors are provided and different record bands are simultaneously processed so that the image having at least double amount or complexity of that of the prior art can be recorded without overrun (the draw rate depends on the amount and complexity of the image) and the capacity of the image memory can be reduced. When viewed from the speed, the image can be recorded logically at approximately double speed of that of the prior art system for the same image.

Further, since the generated image data is transferred to the printer engine 115 not through the bus but through the dedicated route (the selector 114 in the present embodiment), the collision of data on the bus as occurrs in the prior art does not take place and efficient data transfer may always be attained.

[Second Embodiment]

Figure 6:
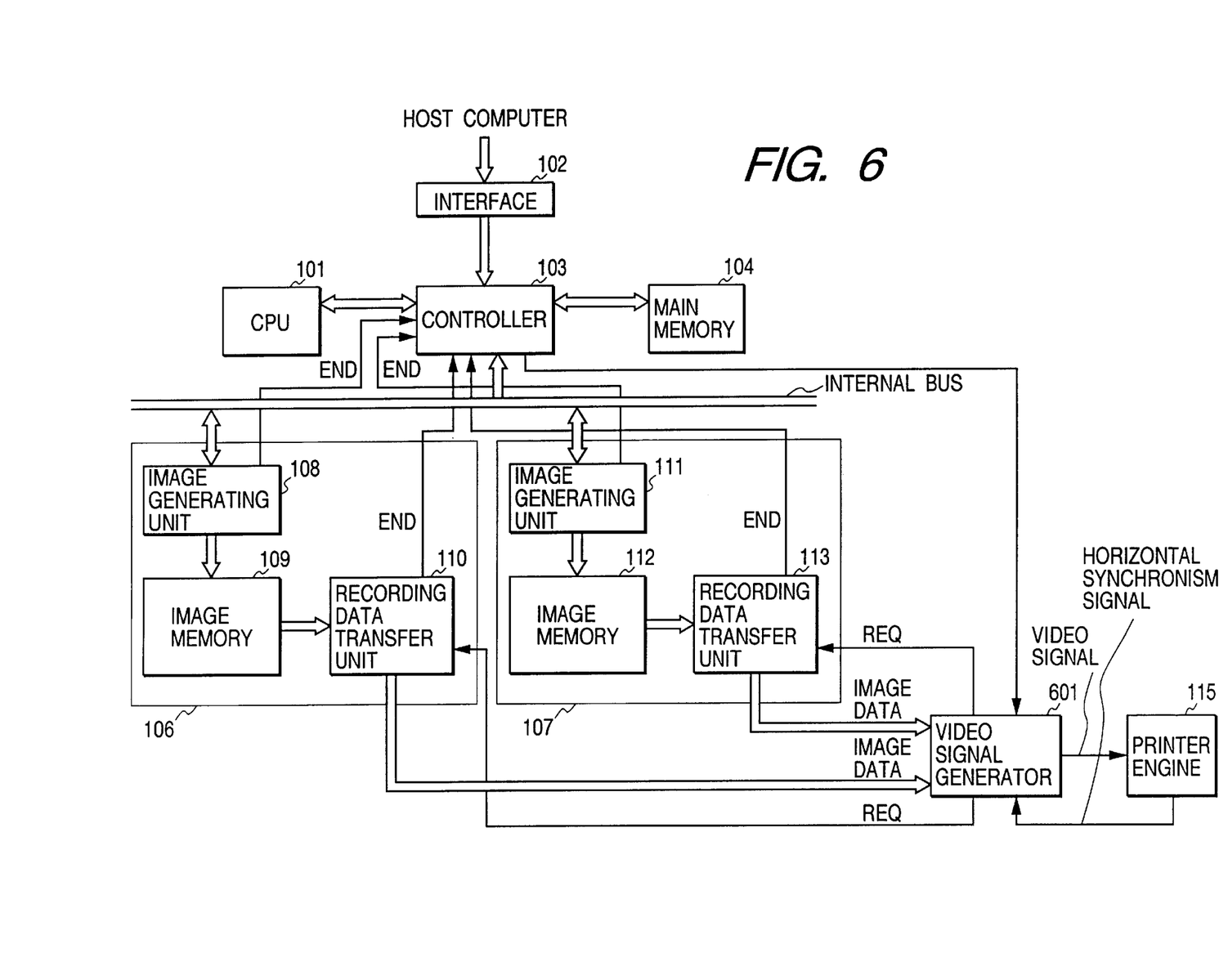
FIG. 6 shows a block diagram of a configuration of a second embodiment of the recording apparatus of the present invention.

FIG. 6 shows a configuration of a second embodiment of the present invention. In the configuration of FIG. 6, a VIDEO signal generator 601 is separated from the respective record data transfer units 110 and 113 and shared. The remaining configuration is the same as that of FIG. 1. The VIDEO signal generator 601 requests necessary image data to one of the record data transfer units by a REQ signal to obtain the image data. The VIDEO signal is generated by the horizontal synchronization signal from the printer engine. Other processes are identical to those of the first embodiment.

With this configuration, the configuration of the record data transfer unit 110 is simplified and the manufacturing cost is reduced.

[Third Embodiment]

Figure 7:
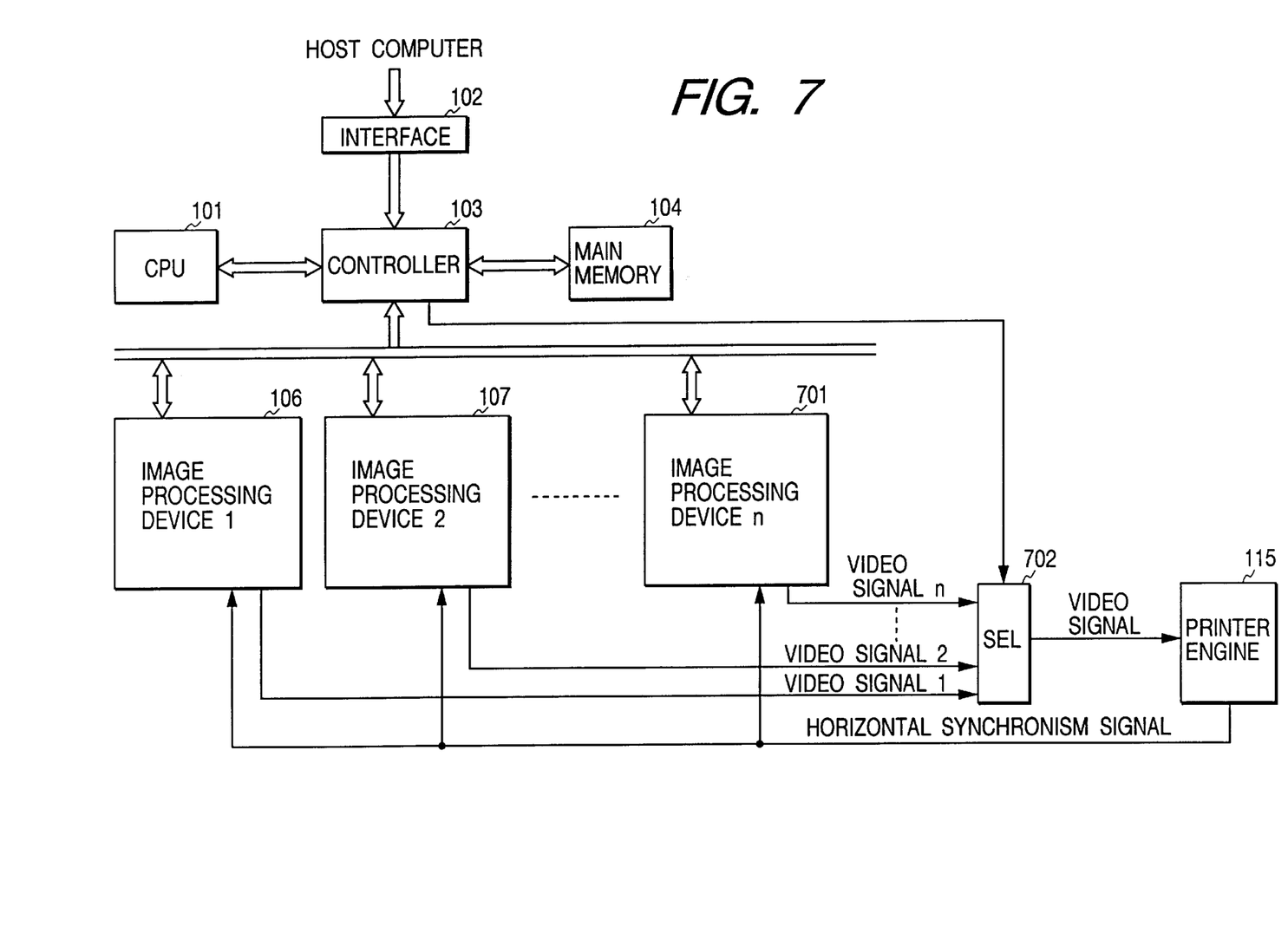
FIG. 7 shows a block diagram of a configuration of a main portion of a third embodiment of the recording apparatus of the present invention.

FIG. 7 shows a third embodiment of the present invention. In the present embodiment, n processors are provided while two processors are provided in the above embodiment. Namely, in FIG. 7, n image processors 1, 2, . . . , n (shown as 106, 107, 701) are provided and the outputs of those processors are selected by a selector 702.

The image processors 1, 2, . . . , n simultaneously process n record bands under the same control as that of the above embodiment, the process results are sequentially selected by the selector 702 and transferred to the printer engine 115 as the VIDEO signal.

In accordance with the present embodiment, n times of image generation of that of the prior art may be attained and a very high speed and fine record is attained without overrun.

[Fourth Embodiment]

Figure 8:
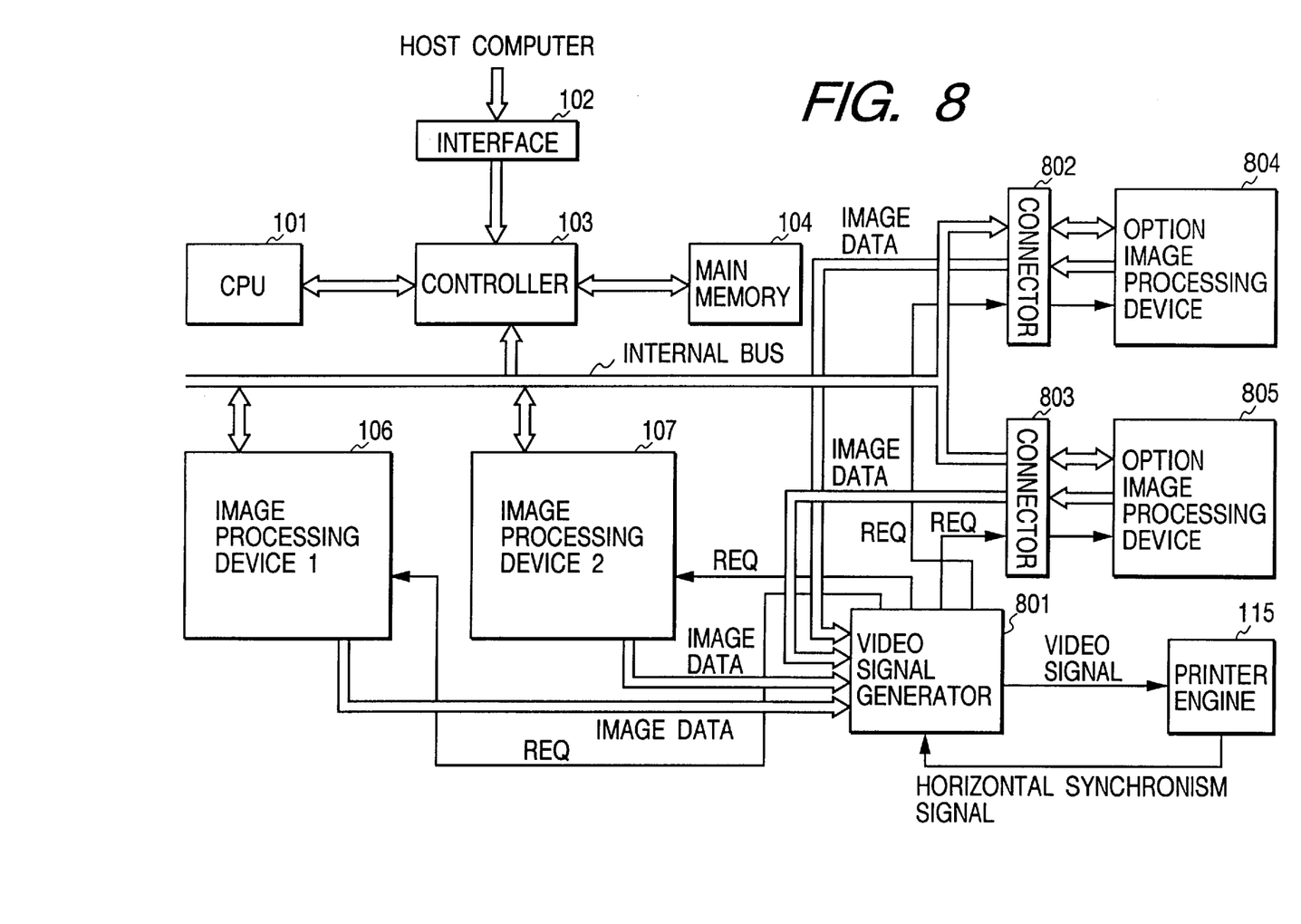
FIG. 8 shows a block diagram of a configuration of a fourth embodiment of the recording apparatus of the present invention.

FIG. 8 shows a fourth embodiment of the present invention. In FIG. 8, a shared VIDEO signal generator 801 is used as in the second embodiment, but the VIDEO signal generator 801 has an increased number of channels compared to the second embodiment so that not only two image processors, but image processors 804 and 805 may be optionally connected.

The image processors 804 and 805 may be connected to connectors 802 and 803 and necessary signals such as REQ signals for requesting the internal bus, the image data signal and the image data are inputted and outputted therethrough.

The image processors 804 and 805 provided as optional units are configured in the same manner as the image processors 106 and 107, but they are constructed as plug-in elements such as PC cards or cartridges.

In accordance with the present embodiment, by the addition of the image processors 804 and 805, a large volume of image data can be recorded at a higher speed and an optimum setting may be made in accordance with a request of the user. The number of image processors is not limited two as shown but any number may be used.

[Fifth Embodiment]

In the configuration of FIG. 1, it is presumed that the image memories 109 and 112 each has at least a capacity for storing one band of an image. However, when the image memories 109 and 112 each has a sufficient capacity to store one page of an image, the process as shown in FIG. 9 may be made.

Namely, the image generation of the image processors 106 and 107 is alternately conducted for each page and the respective pages are alternately transferred by the record data transfer units 110 and 113 to significantly improve the throughput.

Figure 9:
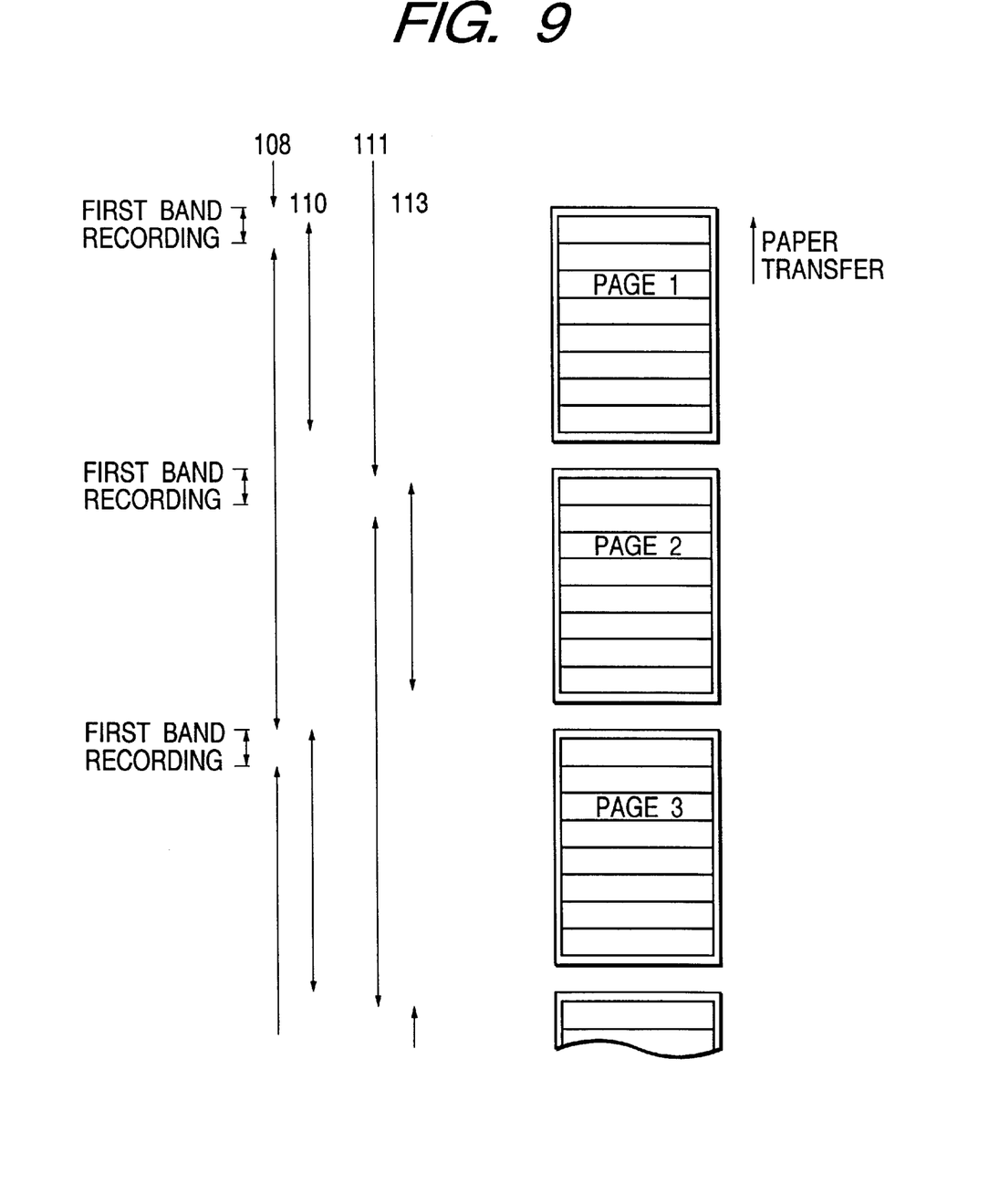
FIG. 9 illustrates an operation in the fourth embodiment of the recording apparatus of the present invention.

Namely, as shown in FIG. 9, after the completion of the output of the first band, each image generation unit may start the drawing of two-page ahead and the image generation unit needs to generate one page of image in the record time for two pages. Thus, the improvement of the throughput or the high speed recording is attained.

In each of the above embodiments, the application list 210 and the object data 211 are generated on the main memory 104 although the same effect may be attained when those data are generated on the image memory of each image processor.

As described hereinabove, in accordance with the present invention, a plurality of image processors each including an image generation unit for generating image data for each drawing unit based on the input record data, an image memory for storing the image data generated by said image generation unit and a data transfer unit for transferring the record data from said image memory to a recording mechanism in synchronism with an operation of said recording mechanism are provided, and image data of different areas on a recording medium are alternately generated by said plurality of image processors. Accordingly, a recording apparatus which can output a fine image, improves the throughput and reduces the complexity of the recording process and conducts a flexible operation in accordance with a data amount to be recorded.

What is claimed is:

1. An image information processing apparatus comprising:

connection means for connecting a printer to said apparatus;

a plurality of conversion means for converting first data into second data by a segment unit, said plurality of conversion means converting different segments of the first data in parallel;

supply means for supplying said plurality of conversion means with the first data by a segment unit via a data channel; and transfer means for transferring the second data converted by said plurality of conversion means to the printer connected by said connection means, in sequence of segments via a data channel, wherein the data channel of said supply means and the data channel of said transfer means physically differ from each other.

2. An apparatus according to claims 1, wherein at least one of said plurality of conversion means is removable.

3. An apparatus according to claim 1, wherein said plurality of conversion means convert the first data into the second data by a band area unit, one frame being composed of a plurality of band areas.

4. An apparatus according to claim 1, further comprising means for inputting, from an external apparatus, data which is not provided by a segment unit and means for converting the input data into the first data by a segment unit.

5. An apparatus according to claims 1, further comprising a plurality of image processing means each including one of said conversion means, wherein said memory means comprises a plurality of memory units each provided in a different one of said plurality of image processing means.

6. An apparatus according to claim 1, wherein said transfer means comprises one of (a) a single transfer unit for transferring the second data converted by said plurality of conversion means, and (b) a plurality of transfer units for transferring the second data converted by said plurality of conversion means, respectively.

7. An apparatus according to claim 1, further comprising recording means for receiving the second data transferred by said transfer means and recording an image specified by the received second data.

8. An apparatus according to claim 7, wherein said transfer means transfers the second data from said memory means in synchronism with an operation of said recording means.

9. An apparatus according to claim 7, wherein said recording means comprises a laser beam printer engine.

10. An apparatus according to claim 7, wherein the second data is raster image data and wherein said transfer means transfer one line of the raster image data from said memory means in synchronism with a horizontal synchronism signal from said recording means.

11. A method of operating an image information processing apparatus to perform an image processing method comprising:

a connecting step of connecting a printer to said apparatus;

a converting step using a plurality of conversion means, of converting first data into second data by a segment unit, said plurality of conversion means converting different segments of the first data in parallel;

a supply step of supplying by a supply means said plurality of conversion means with the first data by a segment unit via a data channel; and a transfer step of transferring, by a transfer means, the second data converted by said plurality of conversion means to the printer connected by said connection means, in sequence of segments via a data channel, wherein the data channel of said supply means and the data channel of said transfer means physically differ from each other.

12. A method according to claim 11, wherein at least one of said plurality of conversion means is removable.

13. A method according to claim 11, wherein said plurality of conversion means convert the first data into the second data by a band area unit, one frame being composed of a plurality of band areas.

14. A method according to claim 11, further comprising an input step of inputting, from an external apparatus, data which is not provided by a segment unit and means for converting the input data into the first data by a segment unit.

15. A method according to claim 11, further comprising a plurality of image processing means each including one of said conversion means, wherein said memory means comprises a plurality of memory units each provided in a different one of said plurality of image processing means.

16. A method according to claim 11, wherein said transfer means comprises one of (a) a single transfer unit for transferring the second data converted by said plurality of conversion means, and (b) a plurality of transfer units for transferring the second data converted by said plurality of conversion means, respectively.

17. A method according to claim 11, further comprising a recording step of receiving the second data transferred by said transfer step and recording, by a recording means, an image specified by the received second data.

18. A method according to claim 17, wherein said transfer step transfers the second data from said memory means in synchronism with an operation of said recording step.

19. A method according to claim 17, wherein said recording step is performed using a laser beam printer engine.

20. A method according to claim 17, wherein the second data is raster image data and wherein said transfer step transfers one line of the raster image data from said memory means in synchronism with a horizontal synchronism signal from said recording means.

* * * * *

UNITED STATES PATENT AND TRADEMARK OFFICE
CERTIFICATE OF CORRECTION

PATENT NO. : 6,246,488 B1
DATED : June 12, 2001
INVENTOR(S) : Masahiko Murata

Page 1 of 1

It is certified that error appears in the above-identified patent and that said Letters Patent is hereby corrected as shown below:

Column 4,
Line 57, "transfer" should read -- transfers --.

Column 6,
Line 65, "as occurrs" should read -- which occurs --.

Column 8,
Line 45, "claims 1," should read -- claim 1, --; and
Line 55, "claims 1," should read -- claim 1, --.

Signed and Sealed this

Twenty-sixth Day of March, 2002

Attest:

JAMES E. ROGAN
Attesting Officer    Director of the United States Patent and Trademark Office